United States Patent

Peyrot

[15] 3,636,294
[45] Jan. 18, 1972

[54] SELF-CENTERING TUBE-BUTTING CLAMP

[72] Inventor: Jean Pierre Peyrot, 8 Domaine du Bel Abord, Chilly-Mazarin, Essonne, France

[22] Filed: Dec. 30, 1969

[21] Appl. No.: 889,163

[30] Foreign Application Priority Data

Dec. 31, 1968 France.................................182,992

[52] U.S. Cl. ..........................................219/60 A, 219/159
[51] Int. Cl. ......................................................B23k 9/02
[58] Field of Search......................219/59, 60, 159, 161, 125; 81/367, 80, 5.1, 303, 308, 309, 341, 386; 269/2, 266; 228/4, 5, 44

[56] References Cited

UNITED STATES PATENTS 2,721,248  10/1955  Kirkpatrick.......................219/125 R
2,054,375  9/1936   Halle.....................................228/4
2,061,287  11/1936  Muehl....................................228/4
2,600,594  6/1952   Williamson.........................81/379 X
3,109,085  10/1963  Otten et al..........................219/60
3,290,971  12/1966  Belual....................................81/367
3,322,456  5/1967   Strakhal et al....................269/266 X
3,436,071  4/1969   Petruccelli.........................269/266 X Primary Examiner—J. V. Truhe
Assistant Examiner—J. G. Smith
Attorney—Karl W. Flocks

[57] ABSTRACT

A self-centering clamp for welding, machining and checking cylindrical parts. The clamp is mounted astride two tubes butted against each other, upon which it centers and finally fixes itself. Once fixed on the tubes, the clamp permits a toothed wheel in the shape of a C to drive in rotation round the tubes, tools for welding, machining or checking same under automatic control and with programmed sequences.

12 Claims, 27 Drawing Figures

PATENTED JAN 18 1972

INVENTOR
JEAN-PIERRE PEYROT
BY Karl W Flocks
ATTORNEY

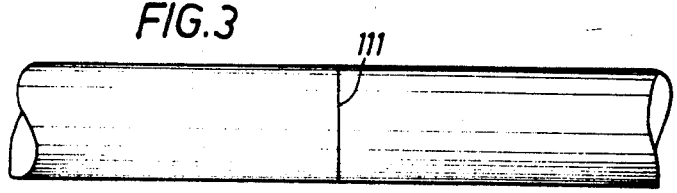
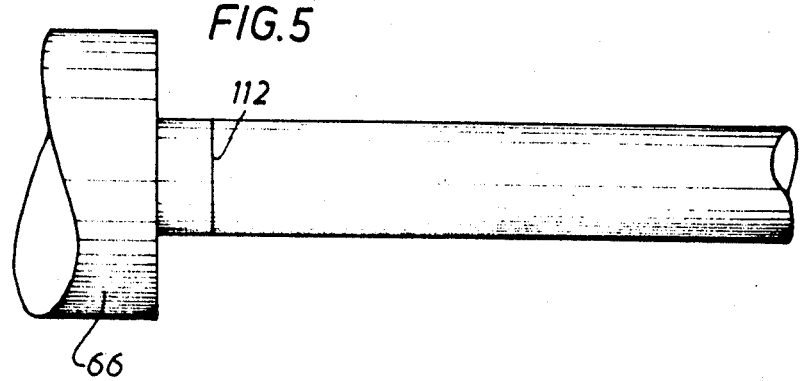
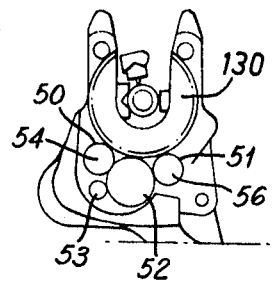
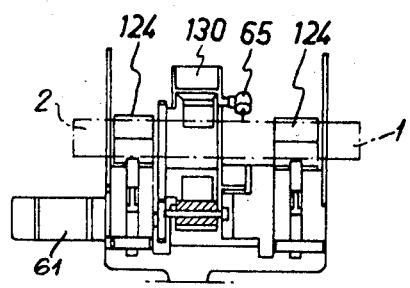

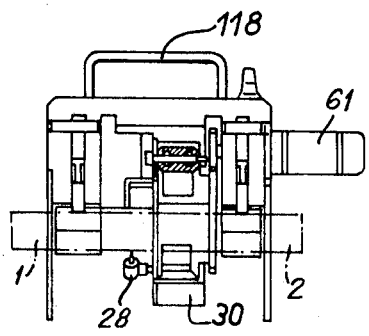
FIG.10
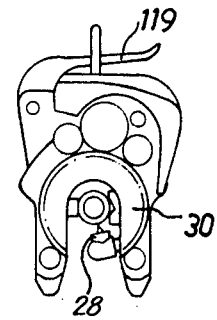
FIG.11
FIG.13
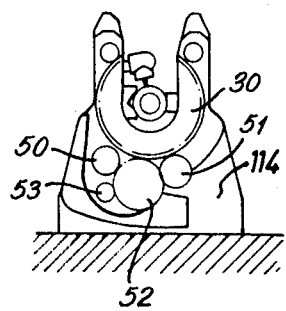
FIG.12
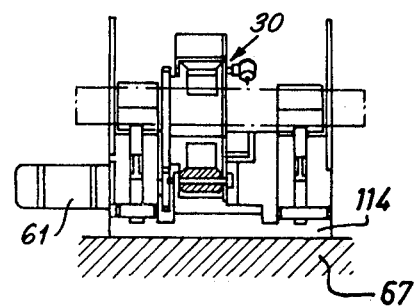

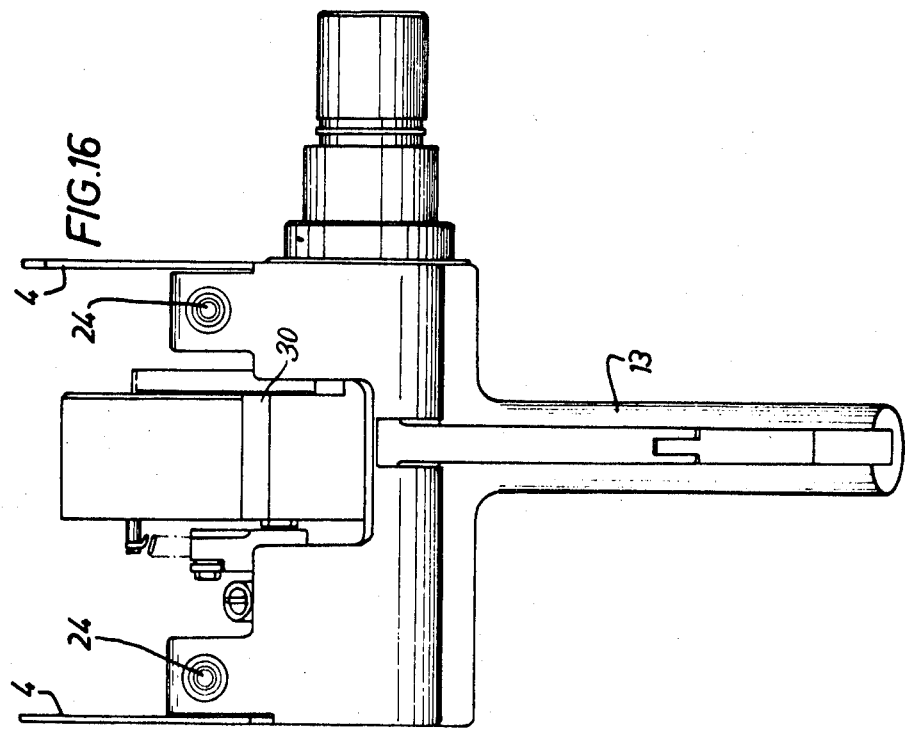
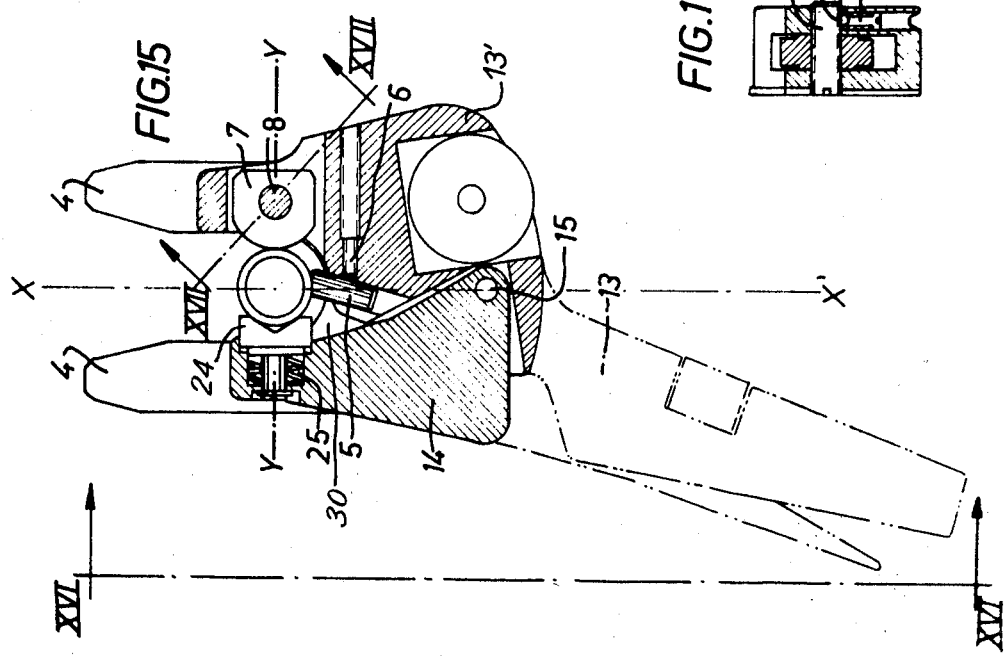

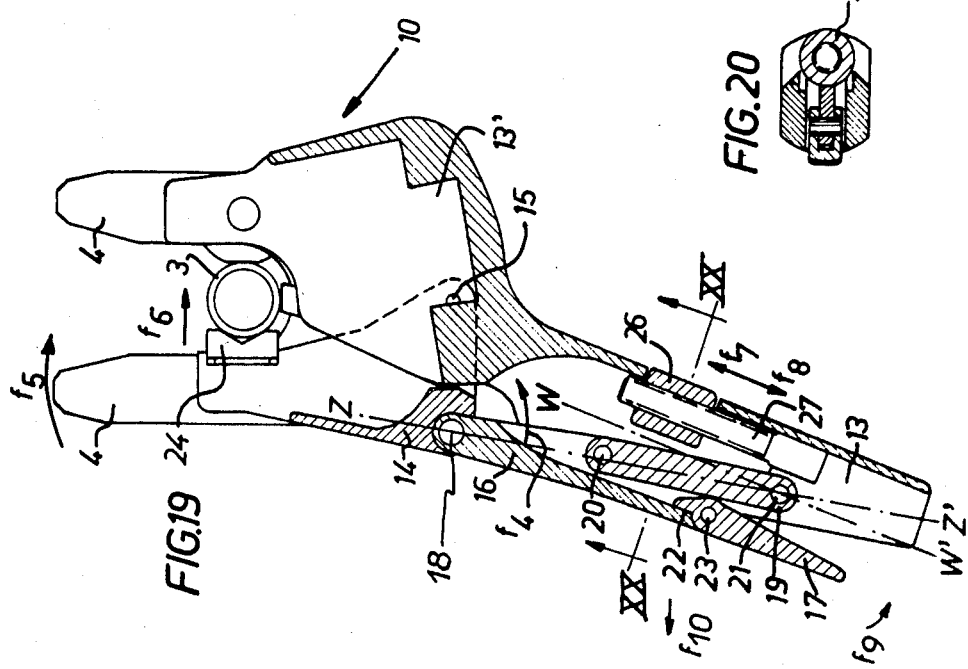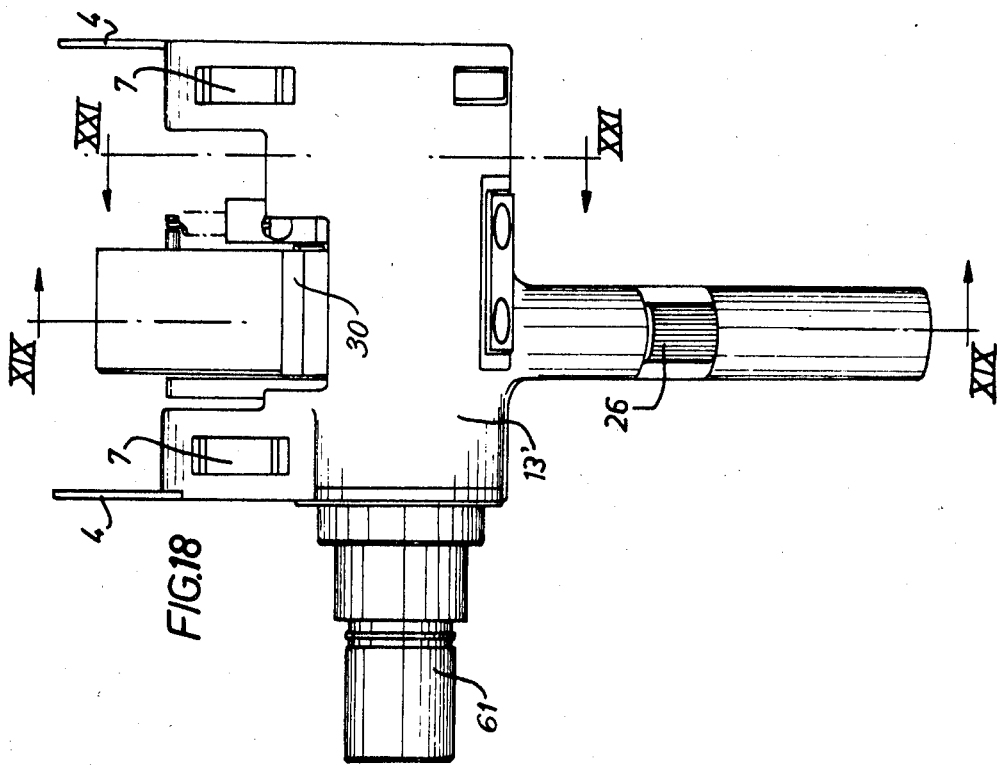

SELF-CENTERING TUBE-BUTTING CLAMP

The present invention relates to a self-centering tube-butting clamp with rapid action, and more particularly to a self-centering clamp for welding, machining and checking cylindrical parts (tubular or solid).

The invention has for its main object to facilitate the operations of welding, machining or checking and to render them more rapid and reproducible. It has also for its object to permit the automation and the preparation of a program for the sequences of these operations.

The invention provides an apparatus which can be mounted astride a cylinder on which it centers and finally fixes itself. Once fixed on the tube, the apparatus permits a toothed wheel in the shape of a C to drive in rotation round the cylinder, tools for welding, machining or checking, under automatic control and with programmed sequences.

The invention has also for its object:

An apparatus which can be employed on cylinders of different diameters, either by changing the jaws or by rotation of a stop device;

A nut modifying the travel of the clamping handle, the gripping force of which is limited by a spring and can be regulated;

A rotating tool-support ring, which is always concentric with the cylinder;

A constant distance from tool to cylinder during the rotation;

Regulation in the axial direction which makes it possible to ensure the correct position of the tool after clamping the part and during the rotation of the tool;

The necessary cables and piping for the tool which do not hinder the operator since they wind round the toothed ring and have a common outlet from the clamp;

The rotation is effected by means of an electric motor;

A slot provided in the rotating ring, which always stops at the same point which puts it in the direction of the open noses of the clamp and permits the apparatus to be rapidly placed on its track or disengaged;

A protected tool which cannot receive shocks when engaging or disengaging the apparatus.

The invention is especially applicable to apparatus intended for carrying work round a cylindrical tube, and still more particularly, by way of new industrial product, is applied to self-centering orbital clamps with rapid grip for butting together tubes by the TIG method of welding, to their special elements, and also to apparatus rotating round a cylinder for carrying out welding operations (with tungsten electrode under gas protection, by plasma or by electronic bombardment) for checking by ultrasonics or by machining (especially electrolytic machining).

Other characteristic features and advantages will be brought out in the description which follows below with reference to the accompanying drawings, and giving purely by way of indication and not in any limitative sense, several forms of embodiment of the invention.

In the drawings:

FIG. 3 is a side view of two tubes butted together without shoulders;

FIG. 4 is an end view of the device shown in FIG. 14;

FIG. 5 is a view of a tube without shoulder butted against a shouldered tubular member;

FIG. 10 is a view in elevation of a self-centering clamp for tubes of large diameter;

FIG. 11 is an end view of the device shown in FIG. 10;

FIG. 12 is a view in elevation of a tubular clamp for bench work;

FIG. 13 is an end view of the device shown in FIG. 12;

FIG. 14 is a partial view in elevation, partly in cross section of a simple self-centering clamp for butted tubes without shoulders;

FIG. 15 is a view in cross section passing through the axis of a jaw of the clamp of FIG. 1;

FIGS. 16 and 17 are views taken respectively along the lines XVI—XVI and XVII—XVII of FIG. 15;

FIG. 18 is an external view looking on the top of the clamp;

FIGS. 19 and 20 are views in cross section taken respectively along the lines XIX—XIX of FIG. 18 and XX—XX of FIG. 19;

Figure 1:
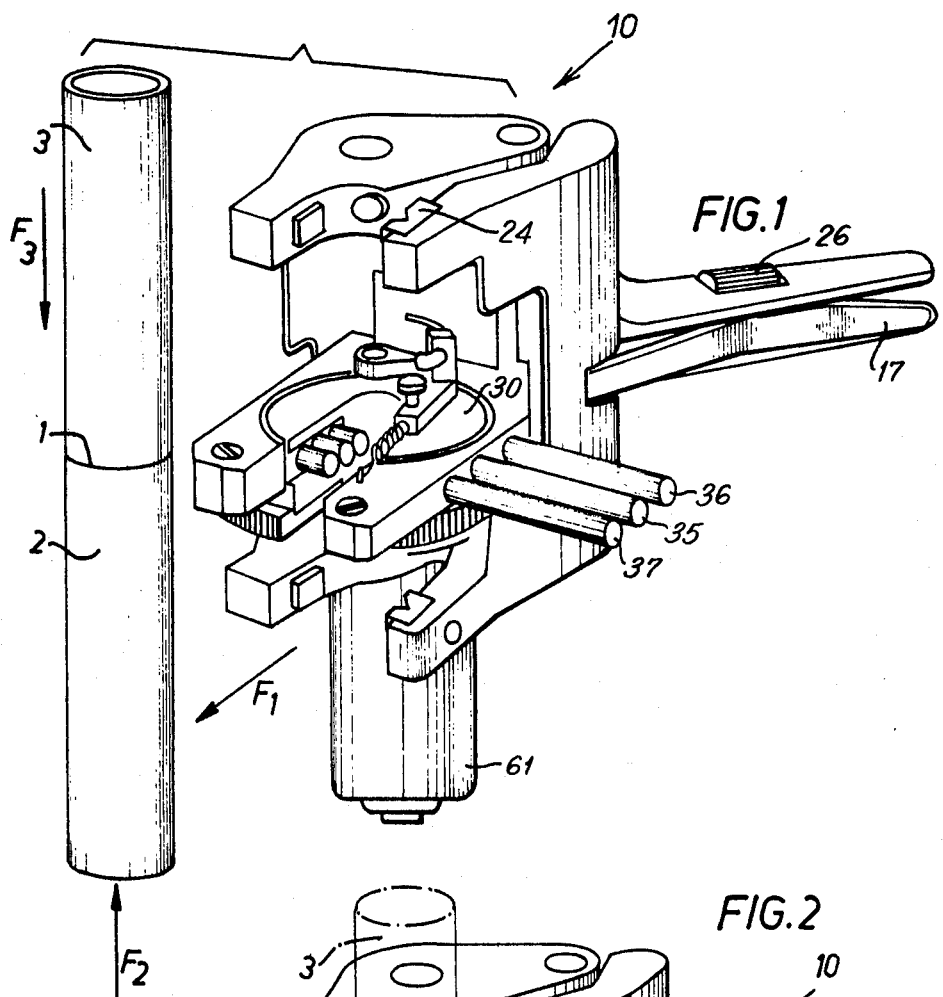
FIG. 1 is a perspective view of a clamp according to the invention, in its open position and in course of introduction on two tubes placed together end to end.

There is shown in FIG. 1 a clamp 10 according to the invention, which is moved forward in the direction of the arrow $F_1$ so as to be placed over a position 1 to be welded between two tubes 2 and 3 butted against each other and forced together by the application of two forces applied in the directions of the arrows F2 and F3.

Figure 2:
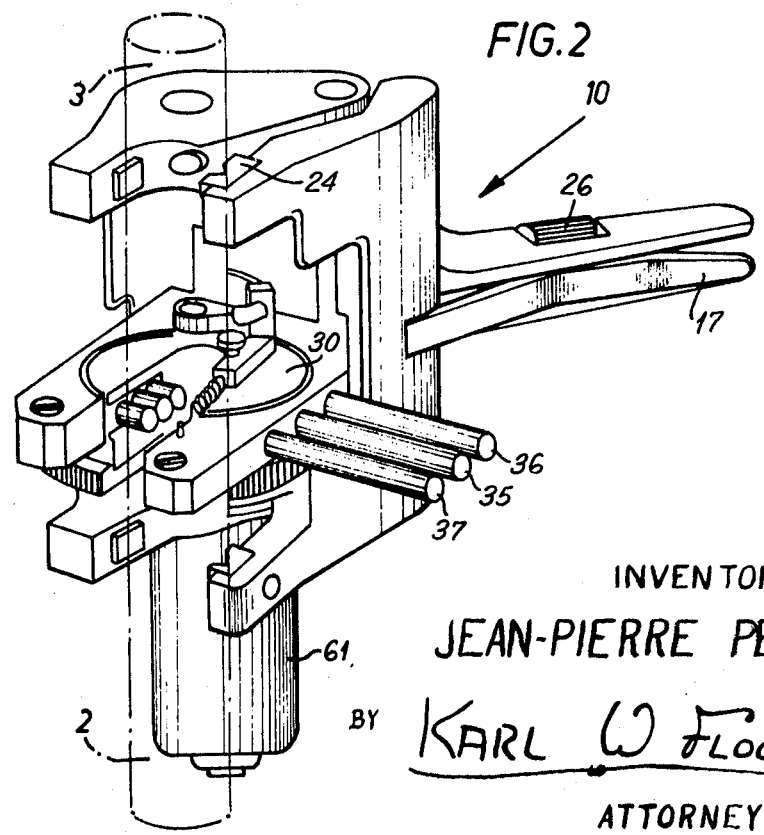
FIG. 2 is a view in perspective of the self-centering clamp of FIG. 1 in the working position of an assembly of tubes.
Figure 7:
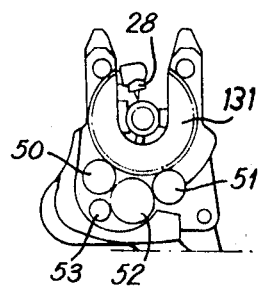
FIG. 7 is an end view of the device of FIG. 6.

When the clamp is in position, it takes up the position shown in FIG. 2 with respect to the assembly of the tubes 2 and 3 to be welded. As can be better seen from FIG. 15, the clamp is set for gripping the tubes by two guiding forks 4, and an abutment 5 is provided for stopping the inwards in the correct position in contact with the tubes. The abutment 5 is adjustable by sliding in its bore and it is locked at the selected length, depending on the diameter of the tube to be welded, by means of a clamping screw 6.

Adjustable abutment member 7 is also engaged against the tube. The abutment 7 is pivotably mounted on a shaft 8, and its position round the shaft is chosen from four available positions, for example, for four tube diameters, and is determined with accuracy by four notches 9 provided in the shaft 8, and in which a ball 11 urged by a spring 12 can become lodged at will. The abutments 5 and 7 define the position on the tubes to be welded on the axes X—X' and Y—Y' respectively.

The clamp 10 comprises two jaws, of which one 13' which carries the abutments, is rigidly fixed to the handle 13, while the other having the reference 14 is pivotally mounted on the handle about a shaft 15.

There is shown in FIG. 19 the articulation of the gripping levers 16 and 17 about a shaft 18 pivotally mounted on the jaw 14. A crank-arm 19 is pivoted at 20 on the lever 16 and at 21 on the handle 13. When the lever 16 is brought close to the handle 13, the lever 17 becomes integral during this operation with the lever 16, against which is supported an abutment 22 and to which it is articulated at 23, and in this movement, the lever 16 rotates in the direction of the arrow F4 about the shaft 18 and the jaw 14 in the direction of the arrow F5 about the shaft 15.

The abutment 24 carrying a herringbone housing then comes into gripping contact with the tubes 2, 3 in the direction of the arrow F6, and the spring 25 (FIG. 15) is compressed. By continuing to clamp the lever 16 against the handle 13, the shaft 20 is caused to pass over its point of equilibrium on the axis Z—Z', and this shaft 20 is thus displaced towards the right (looking on FIG. 19) of the axis Z—Z'. The springs 25 enable the clamping force to be maintained on the tubes, while maintaining the shaft 20 in a locked eccentric position in stable equilibrium on the side of the knurled wheel 26 on the handle 13.

In order to free the assembly 2, 3, a pressure is applied on the lever 17 in the direction of the arrow F9 against the handle 13. The abutment 22, pivoting about the shaft 23 in the direction F10, then causes the lever 16 to pivot about its shaft 20, this movement having the effect of displacing the shaft 8 in the direction of the arrow F5 about the shaft 15.

This movement is made possible by compression of the spring 25 housed between the jaw 24 and the cheek 14; the shaft 20 then passes from the left-hand side of the alignment Z—Z' connecting the shafts 21 and 18, the cheek 14 is free from its eccentric lock and is opened in turn by the expansion of the spring 25.

This knurled wheel 26 enables the position of the shaft 21, rigidly fixed to the screw 27 which moves forwards or backwards in the direction W—W' to be regulated in the direction of either of the arrows F7 and F8 when action is taken on the knurled nut 26. In this way, the variable angle is regulated between the axis W—W' of the handle 13 and the axis Z—Z' of the maximum clamping distance apart of the shafts 18 and 21.

Figure 21:
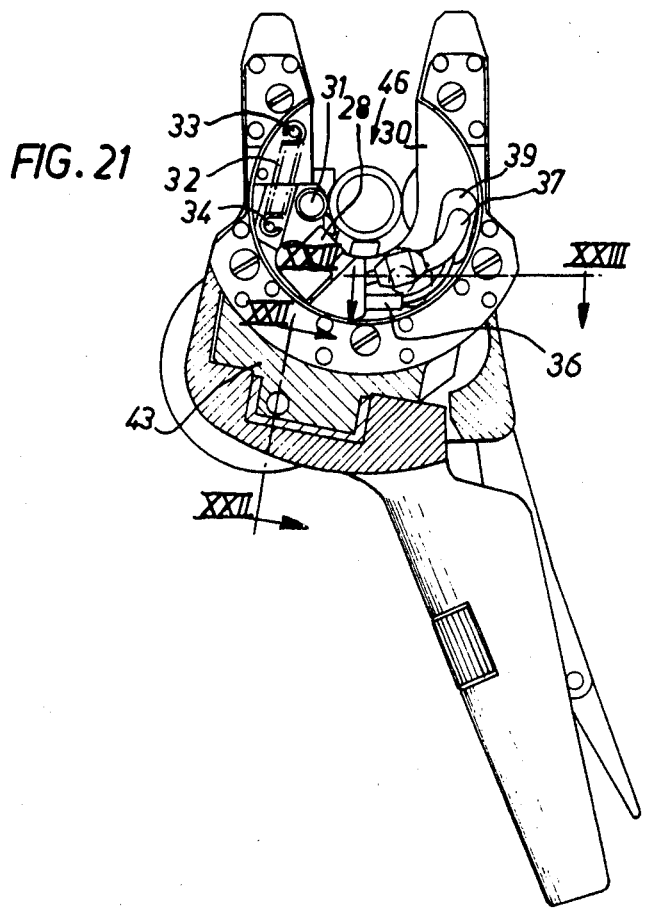
FIG. 21 is a view in cross section taken along the line XXI—XXI of FIG. 18.
Figure 24:
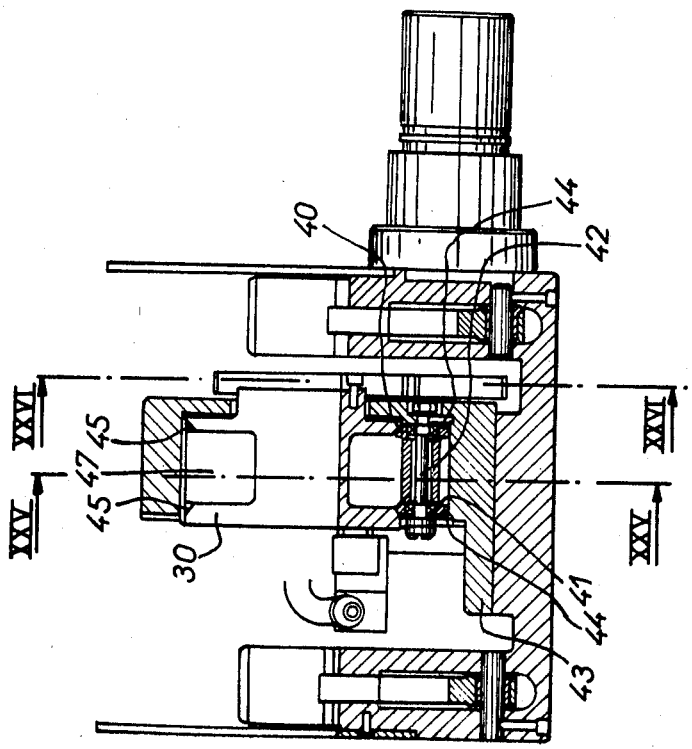
FIG. 24 is a view looking on the top of the clamp cut along the axis of the tubes to be worked.

The clamp 10 being gripped in position on the tubes, it only remains to weld the tubes, and to do this there is employed a miniature TIG torch 28 (FIG. 21), comprising the nozzle, its electrode, and the water and gas circuits fixed to the drum 30 and wound inside a groove provided on the same (see FIG. 24).

This torch is articulated at 29 on a rotating drum 30. The distance from the electrode to the tubes to be welded is kept constant by means of the roller 31 forming part of the torch and supported against the tubes. The contact of the roller with the tube is maintained by the effect of a tension spring 32 hooked at 33 on the drum 30 and at 34 on the torch 28. The roller 31 also protects the nozzle and the electrode during the introduction of the clamp on the tubes or during its disengagement, since it is this roller which first touches the tubes when contact is made and is the last to be disengaged.

It will of course be understood that the torch is perfectly insulated from any contact with the part to be welded, that is to say it is at the same time insulated dielectrically from the drum, the roller and the spring. The supply pipes for the gas intake 35, the water intake 36, the electricity input and water return 37 starting from the torch, pass into the interior of the drum 30 at 38 and 39.

Figure 25:
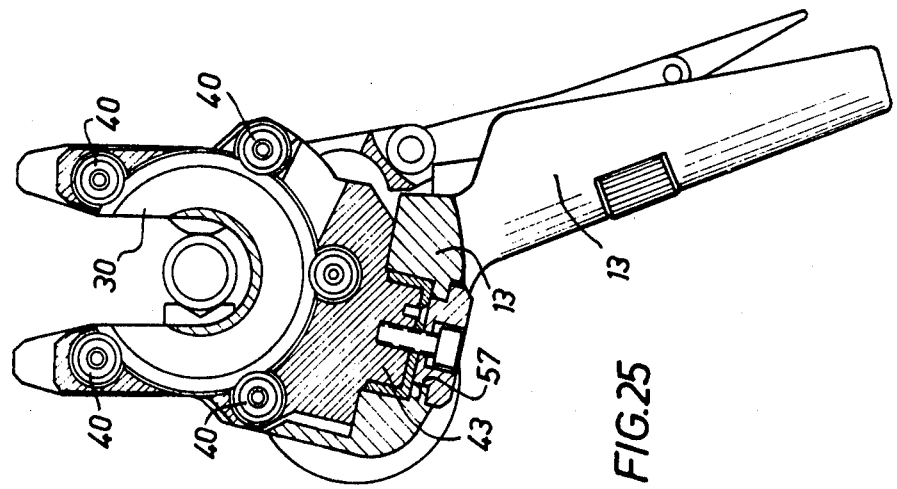
FIG. 25 is a view in cross section along the line XXV—XXV of FIG. 24, passing through the groove of the drum and its centering rollers.

This drum 30 (FIG. 21) or rotating ring, drives the torch 28 in rotation in order that it can carry out its orbital welding operation. It is split at 46, which gives it the form of a C. During the penetration of the tubes, this slot enables them to pass to the center of rotation, since it is always located, when stopped, in the direction of opening of the cheeks. The drum 30 having permitted the introduction of the tubes to be welded, is centered axially and radially by means of the rollers 40 (FIG. 25).

These latter are mounted on ball bearings 41 which are in turn fixed on shafts 42 rigidly coupled to a fixed body 43. The precise axial and radial position of the drum is effected by the chamfers 44 of the rollers 40 and the chamfers 45 of the drum 30.

The centering rollers, which are for example five in number, permit continuous rotation of the drum, since four of these rollers are always in contact with the latter when the slot 46 of the drum passes opposite the fifth roller.

The drum 30 comprises on the other hand a groove 47 which provides for the winding of the gas, water and electricity conduits during rotation. Before being would on the drum, the conduits pass into the clamp through the orifice 48.

Figure 26:
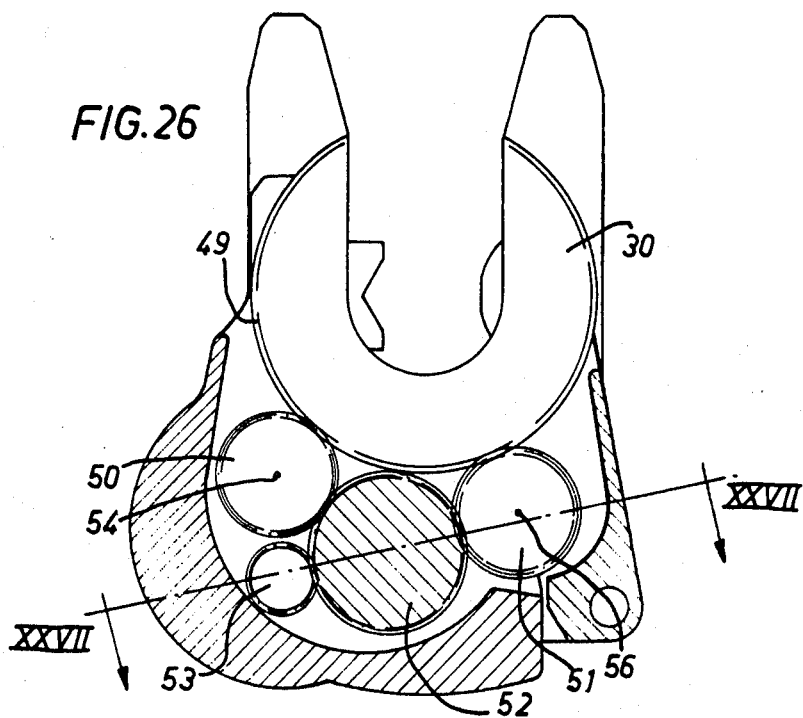
FIGS. 26 and 27 are views in cross section taken respectively along the line XXVII—XXVII of FIG. 24 and XVII—XVII of FIG. 26.

Rotation of the drum 40 is effected by the gear 49 (FIG. 26) to which it is rigidly fixed. For the same reasons as for the drum 30, this gear is split, which gives it the shape of a C. This gear 49 is itself driven by two gears 50 and 51 rotating in the same direction by means of the gear 52, which is in turn driven by a pinion 53. The two gears 50 and 51 rotate in the same direction and therefore permit the gear 49 to be driven continuously, even when the slot misses one of them, since, being coupled by the gear 52, the other only leaves the slot when the first is again engaged with the gear 49.

The drum 30, the rollers 40 and the gear 49 are fixed by means of the roller shafts 42, the gears 50, 51 and 52 are fixed by means of their respective shafts 54, 56 and 55 on the body 43 (FIG. 24).

Figure 22:
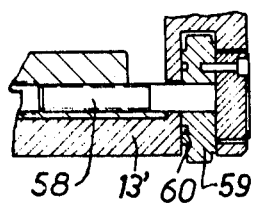
FIGS. 22 and 23 are views in cross section taken along the lines XXII—XXII and XXIII—XXIII of FIG. 21.
Figure 23:
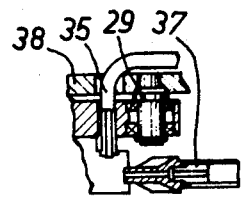

This body 43 is housed in chambers provided in the cheeks 13' and 14. On the other hand, a displacement in the axial direction of the tubes to be welded is permitted by a sliding movement of the body 43 on the slide 57 of the cheek 13'. This displacement is effected by means of a screw 58 screwing into the body 53 actuated manually by a knurled knob 59 mounted in the cheek 13'. The locking of the screw is ensured by the jamming action of a toric rubber joint 60 (FIG. 22). This displacement permits axial adjustment of the torch in order to bring it into position exactly at the desired point of welding.

The axial adjustment does not prevent the rotation from taking place since the pinion 53, the shaft of which is rigidly fixed on the unit 13, has sufficient length of tooth to permit the gear 52 to make the required displacement.

The general rotational drive is effected by a variable speed electric motor 61, which drives the pinion 53 through the intermediary of a speed reduction gear 62.

In order to carry out the welding operation in an entirely automatic manner, and therefore to effect all the sequences necessary for a welding cycle, to adjust the various sequences to requirements and to be able to vary the welding parameters automatically, as required, an impulse emitter is incorporated in the orbital tube-butting clamp. The impulses act on the speed of the motor, the flow-rate of gas and the welding current.

Figure 27:
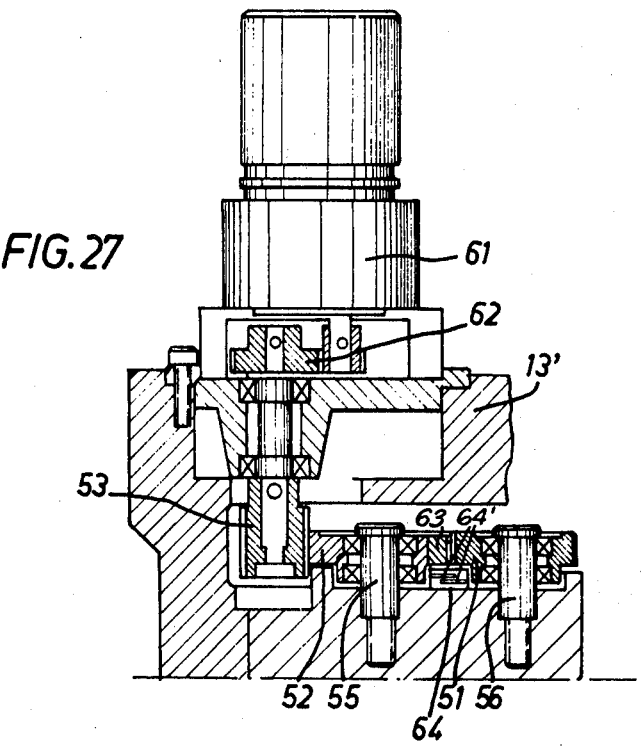

This impulse transmitter comprises for example, with reference to FIG. 27, but with other gear rations, a small permanent magnet 63, rigidly fixed to the rotating gear 52, and the speed of which is 100 revolutions for one revolution of rotation of the gear 49, for example. This magnet passes at each rotation of the gear 52 in front of two blades 64' spaced apart inside a bulb 64 under vacuum, and at each passage causes the two blades 64' to make contact with each other closing a circuit for a fraction of a second. It is by means of these circuit closures every 1/100th of a revolution of the torch that it is possible to intervene at every instant during the course of the welding sequences by referring to the rotation of the gear close to the motor and not to the positions of the parts to be welded. This makes it possible to eliminate any unfortunate incidents which could be brought about by a minimum accidental displacement of the part.

In the case of tubes of considerable length (FIG. 3) without bulky shoulders, the tool carrying out its work at lll, an apparatus according to the invention is shown in the form of the device of FIG. 14. There can be seen in this figure the tool 65 fixed on the rotating ring 120 which operates between the clamping jaws 124.

Figure 6:
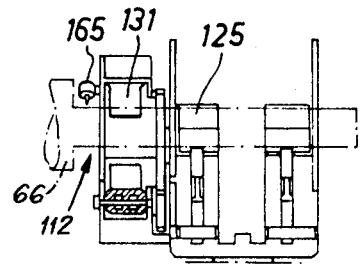
FIG. 6 is a partial view in elevation of a self-centering clamp with an offset tool for shouldered tubular parts.

In the case of FIG. 5, in which the tool is to carry out its work at 112, that is to say close to a face having a shoulder 66 which does not permit the positioning of a jaw, the apparatus takes the form of the device shown in FIG. 6. There can be seen in this figure, the tool 165 fixed on the rotating ring 131 working outside the clamping jaws 125.

Figure 9:
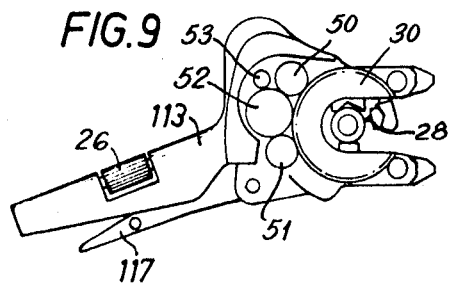
FIG. 9 is an end view of the device of FIG. 8.
Figure 8:
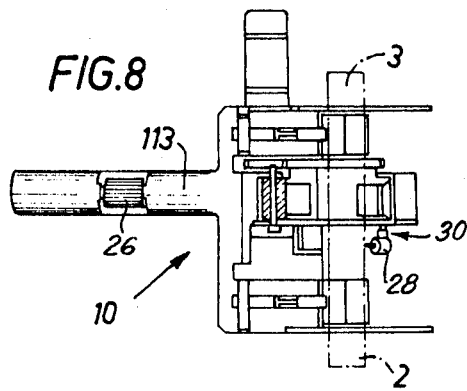
FIG. 8 is a view in elevation of a self-centering clamp for tubes of small diameter.

When the work of the tool is to be carried out around cylinders of small diameter, the apparatus takes the form of the device shown in FIGS. 8 and 9.

In this case, the small dimensions and the low weight of this apparatus make it possible to give it a holding handle 113 and a gripping handle 117 which give it the appearance of a pair of pliers differing in dimensions from the devices previously discussed.

For working on cylinders of large diameter, the apparatus is in the form of the device shown in FIGS. 10 and 11. As its dimensions and its weight are greater, in order to facilitate handling, the handle is replaced by a holding handle 118 and an operating handle 119 to close the clamps against pipes.

In these forms of embodiment, it is clear that the self-centering clamp is brought on to the tubes to be worked. In the case where it is the tube assembly which is brought to the self-centering clamp (working on a bench 67 for example) the clamp is utilized in the form shown in FIGS. 12 and 13 in which the holding and operating handles are eliminated and replaced by a base 114 and means to adjust the pressure and diameter of the clamping, not shown.

The orbital clamp forming the object of the invention can be utilized for other purposes than TIG welding. For this purpose, it is only necessary to change the welding torch 28 and to replace it either by an ultrasonic feeler in the case of ultrasonic inspection, or by a gun in the case of welding by electronic bombardment, or by mechanical feeler in the case of metrological checking, or any other tool, for example for machining, polishing or brushing.

What I claim is:

1. A self-centering clamp performing work on cylindrical parts comprising
    two cheeks spaced from each other and articulated about a shaft;
    each of said cheeks including
        a fork having a pair of abutment means to grip the cylindrical parts;
    handle means operatively connected to said forks to adjust pressure and diameter of clamping;
    a roller mounted substantially U-shaped drum mounted for rotation about an axis passing between said abutment means of said forks longitudinally of the cylindrical parts;
    at least two drive means positioned in spaced driving contact with said drum;
    action means to perform work on the cylindrical parts, fixed to said drum for coaxial rotation therewith;
    conduit means connected to said action means through said drum,
    means on said drum to receive said conduit means;
    said drum, action means, and conduit means being included in the width diameter of said cheeks.

2. The self-centering clamp of claim 1, further characterized by
    said abutment means including
        a cam abutment having a plurality of angular positions for contact with the cylindrical parts,
        a ball controlled by a spring positioned for holding said cam abutment in one of its plurality of angular positions;
    an adjustment stop contacting the cylindrical parts and projecting from the clamp, having a locking screw in contact therewith for immobilizing said stop.

3. The self-centering clamp of claim 2, further characterized by
    said abutment means including
        a further abutment on the opposite side of the cylindrical parts from said cam abutment having a spring pressing against said further abutment,
    said handle means including
        a crank arm eccentrically positioned to lock said abutment means in working position by compression on said spring passing against said further abutment and by further compression of said spring an unlocking action.

4. The self-centering clamp of claim 1, further characterized by
    said handle means including
        a knurled knob operating a screw to move one of said abutment means in translational relation to the other of said pair of abutment means.

5. The self-centering clamp of claim 1, further characterized by
    some of the rollers of said roller mounted drum being in contact with said drum during all positions of said drum.

6. The self-centering clamp of claim 1, in which said action means is a TIG welding torch.

7. The self-centering clamp of claim 1, in which the distance between an electrode of said welding torch and the weld is maintained constant by means of a roller pressed against the cylindrical parts by means of an adjustable spring means stressed between a point on said drum and a point on said torch.

8. The self-centering clamp of claim 1, in which said action means is an electronic bombardment gun.

9. The self-centering clamp of claim 1, further characterized by
    an impulse emitter including
        magnetic means rigidly fixed to one of said drive means, the angular speed of said magnetic means being a multiple of that of said drive means,
        a pair of spaced apart blades inside a bulb under vacuum,
        said magnetic means passing said pair of blades at each rotation of said drive means to establish contact between said blades in a circuit controlling the sequence of cycles of said action means.

10. The self-centering clamp of claim 9 in which said magnetic means is a permanent magnet.

11. The self-centering clamp of claim 1 in which said action means is offset from said drum and said drum is located between said action means and said cheeks.

12. The self-centering clamp of claim 1 further including base means for mounting on a table.

* * * * *